United States Patent [19]

Castile et al.

[11] Patent Number: 5,117,396
[45] Date of Patent: May 26, 1992

[54] LARGE, AIR DEPLOYABLE, VOLUMETRIC HYDROPHONE ARRAY

[75] Inventors: Brett D. Castile, Del Mar; Shelby F. Sullivan, Solana Beach, both of Calif.

[73] Assignee: The United States of America as represented by the Secretary of the Navy, Washington, D.C.

[21] Appl. No.: 835,860

[22] Filed: Feb. 5, 1986

[51] Int. Cl.⁵ .............................................. H04B 1/59
[52] U.S. Cl. ............................................. 367/3; 441/33; 367/153
[58] Field of Search .............. 367/4, 3, 5, 6, 2, 153, 367/173, 129, 165; 441/32, 33

[56] References Cited

U.S. PATENT DOCUMENTS

| | | | |
|---|---|---|---|
| 3,141,148 | 7/1964 | Hueter | 367/153 |
| 3,372,368 | 3/1968 | Dale et al. | 367/3 |
| 3,491,848 | 1/1970 | Giles | 367/154 X |
| 3,886,491 | 5/1975 | Jonkey et al. | 367/153 |
| 3,986,159 | 10/1976 | Horn | 367/4 |
| 4,272,835 | 6/1981 | Flood et al. | 367/4 |
| 4,323,988 | 4/1982 | Will et al. | 367/173 |

*Primary Examiner*—J. Woodrow Eldred
*Attorney, Agent, or Firm*—Harvey Fendelman; Thomas Glenn Keough

[57] ABSTRACT

An air deployable, volumetric hydrophone array uses three horizontal booms radiating from a central hub suspended at the array operating depth. Loose lines of hydrophones are hung from pairs of points on the boom structure and hang in arcs approximating catenaries.

11 Claims, 4 Drawing Sheets

LARGE, AIR DEPLOYABLE, VOLUMETRIC HYDROPHONE ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to the field of underwater sound devices and, more specifically, to acoustic underwater sensor systems.

With the development of underwater launched cruise missiles, modern submarines are acquiring the ability to attack surface ships from increasingly long ranges. Thus, the defense of a surface battle group will require the ability to reliably detect and track submerged submarines within huge expanses of ocean at great distances from the ships.

Areas forward of a moving battle group present a particular problem. In these areas, an enemy submarine may come into a firing position without having to move at high speed, thus avoiding the resulting high emitted acoustic source levels associated with high speed travel.

The difficulties in detecting and tracking a submarine in a tactical situation could be eased by the availability of an appropriate passive acoustic search system. Hydrophone arrays used as the sensors should be ambient-noise limited, rather than self-noise limited, meaning that they should operate dead in the water. Furthermore, they should operate in locations where the ambient-noise field is not dominated by the battle group and, further, they should operate in locations nearer to ocean areas to be searched than to ships of the battle group. Thus, there exists a need for an acoustic underwater sensor system that can be air deployed and that is expendable. Prior to the present invention no such sensor system was believed to exist.

SUMMARY OF THE INVENTION

This disclosure describes a large, air deployable, volumetric hydrophone array that satisfies the above described technological needs. The problem of designing and manufacturing a large, air deployable, volumetric hydrophone array is solved by the structure of the present invention which incorporates a minimum of three horizontal booms radiating from a central hub, suspended at the array operating depth. The booms are preferably comprised of metal tapes which are treated in such a way that they curl and form tubular boom members that can be flattened and rolled onto a compact spool for storage within an array deployment cannister.

The present invention further incorporates loose lines of hydrophones hung from pairs of points on the boom structure and allowed to hang in arcs approximating catenaries. Utilization of the hydrophone array disclosed in this application provides considerable flexibility with the spatial arrangement of the hydrophones as well as good acoustic performance.

The present invention thus provides a structural framework for a large, three-dimensional volumetric sensor array which can be deployed from a small, air deliverable cannister. This array thereby eases the problem of detecting quiet enemy submarines. Due to its particular configuration, the array of the present invention has ten db more array gain than any current array deployable as an off-board sensor.

The framework of the present invention is suspended from a single surface float by a central tank cable. The individual booms of the framework are suspended at several points along their lengths by lines connected to one or more points above the plane of the booms on the central trunk cable. Further, a compliant suspension is provided near the surface float in order to decouple surface wave induced motion from the deep array structure.

Objects of the Invention

Accordingly, it is the primary object of the present invention to disclose a novel, air deployable hydrophone array.

It is a further object of the present invention to disclose a novel, expendable underwater hydrophone array.

It is a still further object of the present invention to disclose a novel underwater hydrophone array that has a wide horizontal aperture that can thereby allow large hydrophone separations thus lowering inter-hydrophone noise correlation in non-isotropic noise fields and which enables fine target resolution even when the usual linear additive beamforming is implemented. This feature is beneficial not only in target localization and tracking, but in detecting relatively quiet targets in environments containing numerous distant, but noisy, surface ships.

Another object of the present invention is to disclose a novel underwater hydrophone array that has a large vertical aperture, consistent with the vertical coherence length of the signal, thereby providing maximum signal gain and making possible the resolution of signals from submerged sources from noise generated at the sea surface.

Other objects, advantages and novel features of the invention will become apparent from the following detailed description of the invention when considered in conjunction with the accompanying drawings.

DESCRIPTION OF THE PREFERRED EMBODIMENTS

Figure 1:
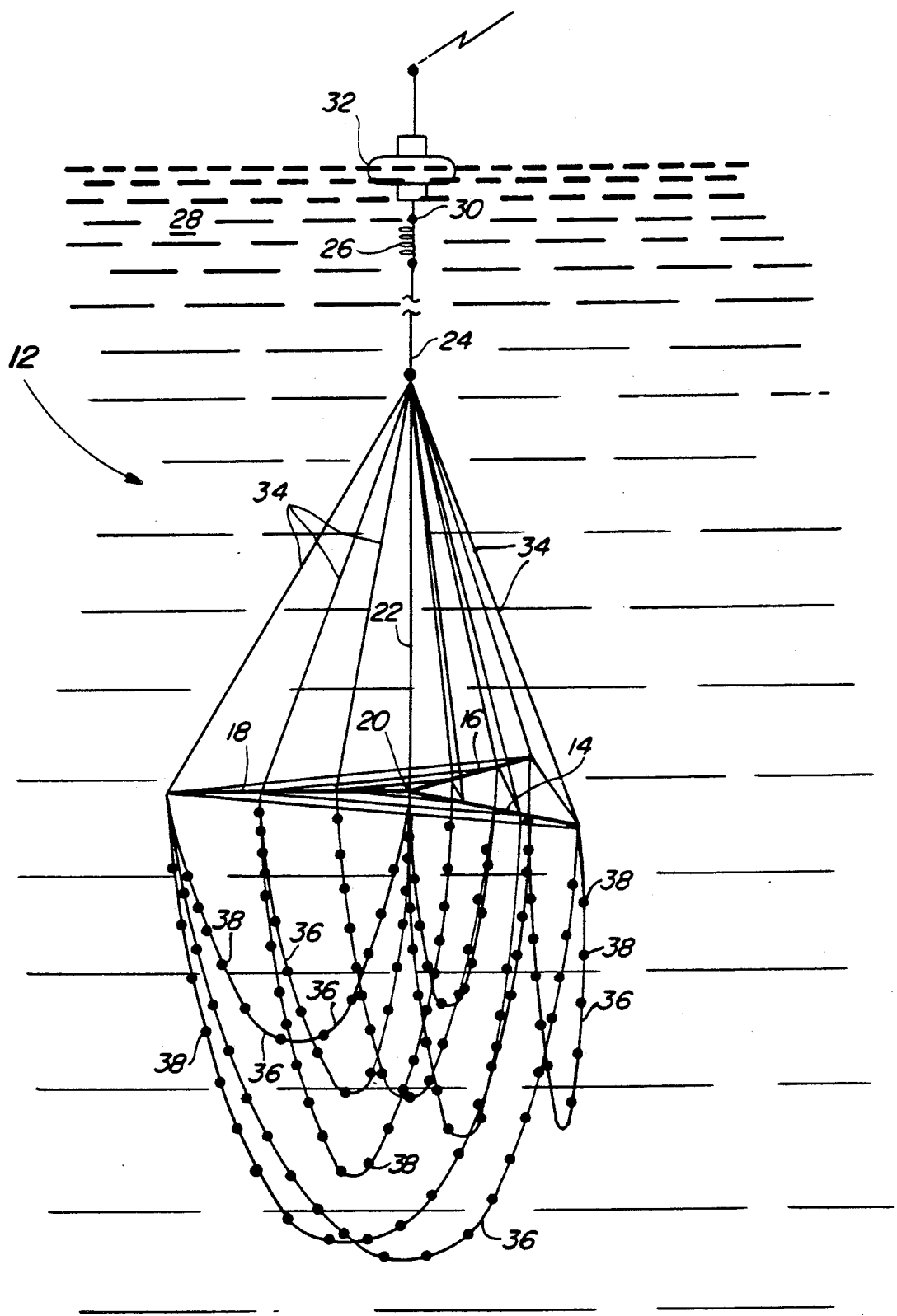
FIG. 1 is a schematic illustration of the air deployable, volumetric hydrophone array of the present invention.

Referring now to FIG. 1 the hydrophone array 12 of the present invention will be described. The support structure for the hydrophone array 12 of the present invention includes three horizontal support booms 14, 16 and 18. The horizontal support booms 14, 16 and 18 are joined at a central radiating hub 20. A vertical support cable 22 is also attached to the central radiating hub 20 and is attached to trunk line 24. Trunk line 24 is, in turn, connected to a compliant suspension 26 which is placed near the surface of the water 28 in order to decouple surface wave induced motion from the deep array structure. The compliant suspension 26 is then again connected to trunk cable 30 above it, trunk cable 30 is in turn connected to buoy 23 which may contain radio transmitting and receiving apparatus or other electronic equipment. In order to provide stability and to minimize the displacement of the horizontal booms 14, 16 and 18 due to wave motion and currents, structural support wires 34 are connected to the top of vertical cable 22 and to various points on the three radiating horizontal booms 14, 16 and 18.

Hydrophone wires 36 are suspended from the three radial horizontal booms 14, 16 and 18 as illustrated, by way of example, in FIG. 1. Each hydrophone wire 36 is attached to two different locations on the horizontal booms 14, 16 and 18. Hydrophones 38 are attached by suitable means to the hydrophone wires 36. The loose lines of the hydrophone wires 36 are allowed to hang in arcs approximating catenaries. The individual arcs of each of the hydrophone wires 36 are of different depths both to give adequate coverage to the array volume and to prevent the hydrophone wires from touching and rubbing one another. In an environment with little ambient water current shear, each arc of hydrophones should lie in a separate plane.

The basic scheme of hanging hydrophone arcs from a small number of horizontal radial booms 14, 16 and 18 provides considerable freedom in the spatial arrangement of the hydrophones 38 within the array. These are choices of the number of arcs in an array, the number of hydrophones on each arc, the locations of the end points of the arcs, the depth of each arc, and the distribution of the hydrophones over the length of each arc. These choices must be made judiciously and will depend upon the particular application and environment intended.

There should also be a sufficient number of hydrophone arcs 36 such that the largest arcs do not contain much more than the square root of the total number of hydrophones in the array. The spurious side lobes due to the planar spatial distribution of any one arc will be minimal.

The end points of the arcs within an array should be chosen so that arcs do not lie on parallel planes. Otherwise, with beamforming, the back lobes of the individual planes will coincide, and add coherently to produce a spurious lobe from the array.

The depths of the individual arcs must be chosen so that hydrophone lines 36 do not touch and rub against each other after deployment of the array. This could produce sufficient noise to limit the performance of the array. The depths of the arcs should be chosen in such a way that the entire vertical aperture of the array is adequately sampled by a distribution of hydrophones that has an acceptable weight distribution along the vertical dimension.

Figure 3:
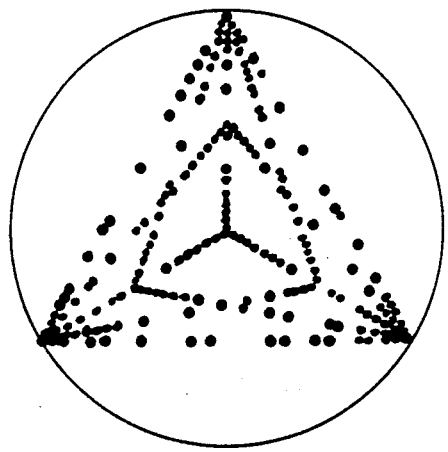
FIG. 3 is a top view of the locations of two-hundred fifty six hydrophones in an array of twelve grouping arcs in accordance with the present invention.
Figure 5:
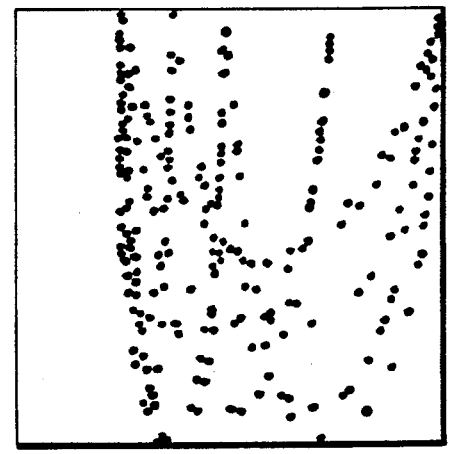
FIG. 5 is a view form the X-direction of the two-hundred fifty six hydrophones illustrated in FIG. 3.
Figure 4:
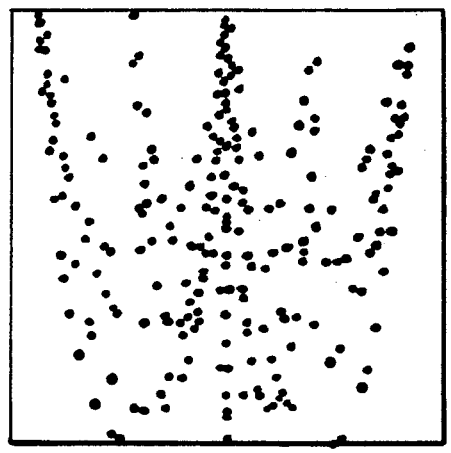
FIG. 4 is a view from the Y-direction of the two-hundred fifty six hydrophones illustrated in FIG. 3.

FIGS. 3, 4 and 5 illustrate, respectively, a top view, a view form the Y-direction and a view from the X-direction of an array of two-hundred fifty six hydrophones affixed to twelve drooping arcs. The hydrophones are randomly distributed with a uniform density over the arc lengths. Large clumps can be seen in the to view of FIG. 3 at the tips of the booms and at the central hub with smaller ones at the midpoints of the booms. The hydrophone distribution illustrated in FIGS. 3, 4 and 5 is, of course, by way of example only.

Figure 6:
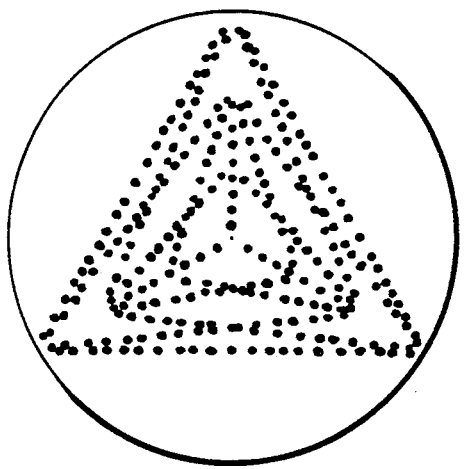
FIG. 6 is a top view of a hydrophone distribution arrangement in accordance with the present invention.
Figure 8:
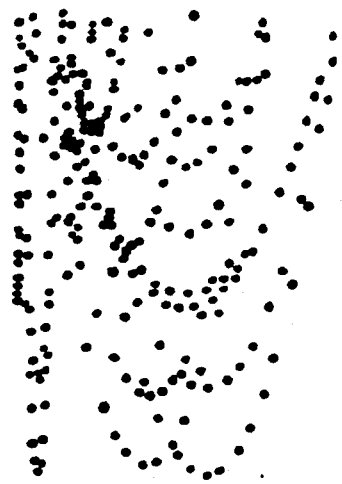
FIG. 8 is a view from the X-direction of the hydrophone distribution illustrated in FIG. 6.
Figure 7:
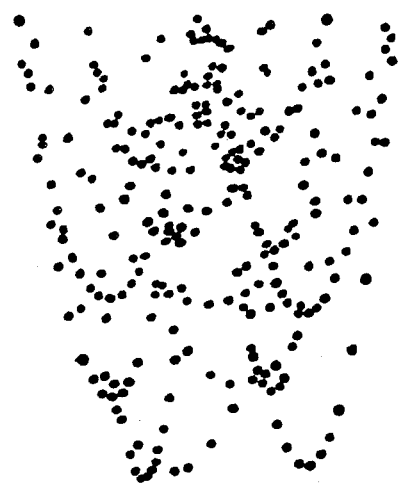
FIG. 7 is a view form the Y-direction of the hydrophone distribution illustrated in FIG. 6.

As another example, FIGS. 6, 7 and 8 illustrate, respectively, a to view, a view from the Y-direction and a view from the X-direction of a hydrophone distribution that may be utilized in accordance with the present invention. In this distribution illustrated in FIGS. 6, 7 and 8, the hydrophones are distributed along the arcs with uniform density in the horizontal dimension only. The two-hundred fifty six hydrophones illustrated in FIGS. 6, 7 and 8 are placed with uniform weighting along the horizontal dimensions of each arc. The hydrophones 38 are randomly placed, but with the constraint that the minimum horizontal separation between pairs on the same arc is onehalf of the wavelength at 250 Hz. The mean horizontal separation between neighboring hydrophones on these arcs is about 0.7 wavelengths.

Figure 2:
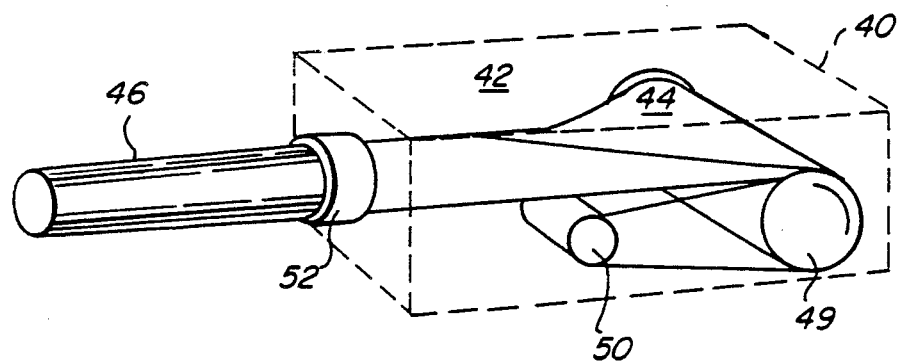
FIG. 2 is an isometric illustration of a storable, tubular, expandable module suitable for utilization as the boom structure of the present invention.
Figure 2A:
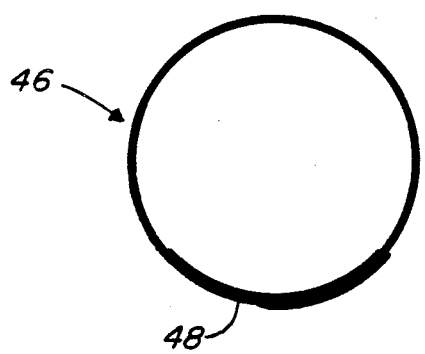
FIG. 2A is a cross-section of the STEM device illustrated in FIG. 2.

FIG. 2 illustrates, by way of example, a mechanism suitable or use in the present invention in deploying the boom structures 14, 16, 18 and 22. The mechanism illustrated in FIG. 2 is known as a STEM device manufactured and available from the Astro Research Corporation. The STEM device 40 is a storable, tubular, extendable module and comprises a container 42 that encloses a thin strip or tape of metal 44 which is treated in such a way that it curls and forms a tube 46 with an overlapped sam 48 as is depicted in the STEM cross-section of FIG. 2A. The strip of metal 44 of the STEM device is stored on a storage spool 49 and may be payed out via drive motor 50 contained within the housing 40. As the strip of metallic tape 44 is payed out from the storage spool 49 and as it exits the housing 40, it is passed through a deployment guide ring 52 which helps to maintain the tubular structure 46. As should be readily understood, four of the STEM devices 40 may be joined together at a central radiating hub to thereby form the mechanisms for paying out the three horizontal booms 14, 16 and 18 and the vertical boom 22 illustrated in FIG. 1. This deployment mechanism is described in further detail in U.S. Pat. No. 4,850,915, filed Apr. 10, 1987 and issued Jul. 25, 1989, and entitled "Apparatus For Deploying And Supporting A Large Aperture Volumetric Array In A Medium," and filed in the names of William C. Beck, Eric M. Lambert of the Hazeltine Corporation and James Wilson of the Astro Research Corporation.

Obviously many modifications and variations of the present invention are possible in the light of the above teachings. It is therefore to be understood that within the scope of the appended claims the invention may be practiced otherwise than as specifically described.

What is claimed is:

1. A hydrophone array comprising:
a plurality of supporting booms joined together;
a plurality of lines, each being attached at two locations to said plurality of supporting booms, each of said plurality of lines drooping down from said attachment locations so as to approximate the shape of a catenary; and a plurality of hydrophones attached to each of said plurality of lines.

2. The array of claim 1 wherein:

said supporting booms are attached at a central hub and radiate outwardly therefrom.

3. The array of claim 2 wherein:

said plurality of supporting booms comprises at least three horizontal booms attached at said central hub and generally lying in a common plane.

4. The array of claim 2 further comprising:

a vertical cable attached to said central hub.

5. The array of claim 3 further comprising:

a surface float to which said vertical cable is attached.

6. The array of claim 5 further comprising:

a compliant member connected between said surface float and said vertical cable.

7. The array of claim 6 further comprising:

a plurality of structural support wires connected between said horizontal booms and said vertical cable.

8. The array of claim 1 wherein:

none of said catenaries formed by said plurality of drooping lines lie in the same plane.

9. The hydrophone array of claim 1 wherein:

each of said plurality of hydrophones is distributed with a substantially uniform density along each of said plurality of lines.

10. The hydrophone array of claim 1 wherein:

said plurality of hydrophones are distributed along said plurality of lines with a substantially uniform density in the horizontal dimension only.

11. The hydrophone array of claim 1 wherein:

each plurality of hydrophones that is attached to each of said plurality of lines is distributed such that the hydrophones of each said plurality are positioned both vertically and horizontally with respect to each other.

* * * * *